(12) United States Patent
Galvani et al.

(10) Patent No.: US 10,594,683 B2
(45) Date of Patent: Mar. 17, 2020

(54) ENFORCE DATA SECURITY BASED ON A MOBILE DEVICE, POSITIONING, AUGMENTED REALITY

(71) Applicant: INTERNATIONAL BUSINESS MACHINES CORPORATION, Armonk, NY (US)

(72) Inventors: Alberto L. Galvani, Aprilia (IT); Ugo Madama, Rome (IT); Paolo Ottaviano, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 15/176,832

(22) Filed: Jun. 8, 2016

(65) Prior Publication Data

US 2017/0359330 A1    Dec. 14, 2017

(51) Int. Cl.
*G06F 21/00* (2013.01)
*H04L 29/06* (2006.01)
*H04W 12/08* (2009.01)
*G06F 3/01* (2006.01)
*H04W 4/02* (2018.01)
*H04W 12/00* (2009.01)

(52) U.S. Cl.
CPC ............ *H04L 63/083* (2013.01); *G06F 3/011* (2013.01); *H04L 63/0492* (2013.01); *H04W 12/08* (2013.01); *H04L 63/107* (2013.01); *H04L 2463/061* (2013.01); *H04L 2463/082* (2013.01); *H04W 4/026* (2013.01); *H04W 12/00503* (2019.01); *H04W 12/00504* (2019.01)

(58) Field of Classification Search
USPC ......................................................... 713/183
See application file for complete search history.

(56) References Cited

U.S. PATENT DOCUMENTS

| | | | |
|---|---|---|---|
| 6,847,892 B2 | 1/2005 | Zhou et al. | |
| 8,583,924 B2 | 11/2013 | Caballero et al. | |
| 8,977,294 B2 | 3/2015 | De Atley | |
| 9,344,275 B2 | 5/2016 | Bar-El et al. | |
| 2007/0041058 A1* | 2/2007 | Disatnik | G06F 3/0317 358/486 |
| 2010/0040293 A1 | 2/2010 | Hermann et al. | |
| 2011/0004756 A1* | 1/2011 | Caballero | G06F 21/10 713/168 |
| 2011/0010675 A1 | 1/2011 | Hamilton, II et al. | |
| 2013/0004016 A1 | 1/2013 | Karakotsios et al. | |

(Continued)

FOREIGN PATENT DOCUMENTS

| | | |
|---|---|---|
| EP | 2166487 | 4/2012 |
| WO | 2012104312 | 8/2012 |

*Primary Examiner* — Jeffrey C Pwu
*Assistant Examiner* — Samuel Ambaye
(74) *Attorney, Agent, or Firm* — Tutunjian & Bitetto, P.C.; Scott Dobson (57) ABSTRACT

Systems and methods are provided for securing data using a mobile device. The method may include determining securing global positioning data values of the mobile device; measuring a securing direction of the mobile device relative to a magnetic north direction; capturing a securing password by the mobile device; and securing the data against unauthorized access using the determined global positioning data values, the securing password, and the securing direction as a combined password.

19 Claims, 5 Drawing Sheets

(56) References Cited

U.S. PATENT DOCUMENTS

2014/0321720 A1* 10/2014 Bank ................. G06K 9/00308
    382/118
2015/0082400 A1    3/2015 Fakhrai et al.
2016/0187140 A1*  6/2016 Clarke ................. H04L 63/083
    701/25
2016/0300054 A1* 10/2016 Turgeman ............... H04L 63/08

* cited by examiner

ENFORCE DATA SECURITY BASED ON A MOBILE DEVICE, POSITIONING, AUGMENTED REALITY

BACKGROUND

Technical Field

The invention relates generally to a method for securing data, and more specifically, to a method for securing data against unauthorized access using a mobile device. The invention relates further to a system for securing data using a mobile device, and a computer program product.

Description of the Related Art

Protecting data and data security are key factors of today's data processing and data storage environments. A tremendous amount of personal and confidential information is stored as digital documents which should only be accessible by authorized persons. Data encryption, passwords, pattern recognition, fingerprints and similar mechanisms have been used to deny unauthorized and data access. Data security is typically enforced by password or a two way password mechanism. However, experience teaches that simple passwords may not be sophisticated enough to protect sensitive data. Additionally, data protection and privacy laws enforce stronger and stronger protection of personal data.

Thus, additionally protective structures, features and securing mechanisms have to be provided in order to increase the level of security to avoid unauthorized access to confidential data. However, for users there should not be an outrageous additional burden for reaccessing that once protected data against unauthorized access.

SUMMARY

According to an aspect of the present invention, a method for securing data using a mobile device may be provided. The method may comprise determining securing global positioning data values of the mobile device, and measuring a securing direction of the mobile device relative to a magnetic north direction. Furthermore, the method may also comprise capturing a securing password by the mobile device, and securing the data against unauthorized access using the determined global positioning data values, the securing password, and said securing direction as a combined password.

According to another aspect of the present invention, a system for securing data using a mobile device may be provided. The system may comprise a global positioning data receiver adapted for receiving global positioning data values of the mobile device as well as securing global positioning data values, and an input unit adapted for capturing a securing password. Moreover, the system may comprise a compass module adapted for measuring a securing direction of the mobile device relative to a magnetic north direction, and a data protection module adapted for securing the data against unauthorized access using the determined global positioning data values, the securing password, and the securing direction as a combined password.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Preferred embodiments of the invention will be described, by way of example only, and with reference to the following drawings.

Throughout the drawings, same or similar reference numerals represent the same or similar elements.

DETAILED DESCRIPTION

It may be noted that all features at a point in time when the data are secured may be denoted by the prefix "securing", e.g., securing orientation, etc. A comparable prefix, namely "accessing", will be used for features relating to the data access or reaccess.

In the context of this description, the following conventions, terms and/or expressions may be used:

The term 'securing' may denote only granting access to data to a user with predefined access rights. The access rights may be linked into the combined password. Reaccess to the secured data may then only be granted to users fulfilling all prerequisites, in particular those that have been used by the user when protecting or securing the data.

The term 'mobile device' may denote any mobile device having some features combined like a display, an input device like—but not limited to—a touch screen and an electronic compass or magnetometer. A smartphone may fulfil such prerequisites. However, they may also be met by a special purpose device, an electronic camera, a personal digital assistant, and the like.

The term 'securing global positioning data values' may denote data values measured by a GPS (Global Positioning System) receiver of the mobile device when the data may be secured. Thus, securing the data may be related to a geographical position. The Global Positioning System (GPS) is a space-based navigation system that provides location and time information, anywhere on or near the Earth where there is an unobstructed line of sight to four or more GPS satellites. The same may apply to an 'access global positioning data values'.

The term 'securing password' may denote a classical password in alphanumeric form to be typed on a keyboard. However, in a broader sense the password may as well be a fingerprint scanned by a fingerprint sensor, a retina scan performed by a retina scanner, data from a voice sensing and recognition device and/or a combination of the aforementioned. The same may apply to an 'access password'.

The term 'securing direction' may denote a direction in relationship to the magnetic north direction. The magnetic north direction may be defined as the direction from a person's position and orientation to the direction of the Magnetic North Pole.

The term 'unauthorized access' may denote—in contrast to authorized access—access to specifically secured data. Here, the data may be protected by the combined password. All related elements of the combined password need to match each other if comparing a securing process and a reassess process.

The term 'combined password' may denote a password joining several individual passwords or security features. The elements of the combined password may have different attributes, like alphanumeric characters, image data, voice data, GPS data, direction data, and the like.

The term 'orientation sensor' may denote one or more sensors allowing measuring an orientation of a device, like a mobile device like a smartphone. The measured values may be given as values in degree, as azimuth, pitch and roll. Thus, an orientation of the device may be determined uniquely in a 3-dimensional space.

The term 'avatar' may denote a graphical representation of the user or a user representing characters in a virtual world or on a map of the real world. It may take either a 3-dimensional form, as in games or virtual worlds, or a two-dimensional form as an icon in Internet forums and other online communities. For the purpose of the currently proposed method and system both alternatives may work as well.

The proposed method for securing data using a mobile device and the related system may have multiple advantages and technical effects:

The usage of the GPS position and the orientation of a mobile device relative to a direction towards the Magnetic North Pole is able to enhance the security of data significantly. A user may only remember his relative position in a given environment like a natural environment or a building or a room. He may simply look into the same direction when reassessing the data compared to the direction he took when securing the data. This orientation within the room is then used for a calculation relative to the direction towards the Magnetic North Pole. Using cylinder coordinates is one option. Using spherical coordinates is another option. In this second case, also the azimuth angle may be used additionally as data securing parameter as part of the combined password.

The combined password comprising the GPS coordinates, the direction relative to the northern direction and the alphanumeric password may be enhanced with additional security aspects and features like face recognition, image comparison, retina scans, fingerprint etc. Additionally, the data may be stored in a storage in the mobile device or remotely on any given storage server. The data may be transferred wirelessly to and from the mobile device.

The option to use an avatar to simulate a person being located at accessing GPS coordinates and orienting the avatar—like a person—in order to determine the relative angle to the Magnetic North direction, makes the proposed solution flexible. A user does not need to be at the securing physical place again for reassessing the data. He moves virtually on a map to the place.

From a user perspective, the user may be enabled to "store" data in a room around him at a given place. This makes securely storing data very intuitive. The input of the password may even be avoided. Thus, only the GPS coordinates and the direction may be used as data securing parameters. That may also work but not be so secure.

According to one preferred embodiment of the method, measuring a securing direction of the mobile device relative to a magnetic north direction may comprise positioning the mobile device at arm's-length in front of a face of a user, and measuring a distance from the mobile device to the eyes of the user. The positioning may be performed by a user. He may simply hold the mobile device in one hand an arm's-length away from his face, preferably in a horizontal direction relative to a horizontal ground. A camera—like a front camera of a smartphone—may be directed to the face of a user. A function—e.g., implemented in software or as a hardware module—may be available to determine the distance between the mobile device and the eyes of the face. This may generate an additional feature for the combined password: the distance mobile device to eyes. Thus, if the user may hold the mobile device at a different distance than an arm's-length away from his eyes, a different combined password may be related to this different distance. Hence, according to another preferred embodiment of the method, the measuring a securing direction of the mobile device relative to a magnetic north direction may also comprise measuring a distance between the mobile device and the eyes of the user as securing distance.

According to a further preferred embodiment of the method, the combined password may also comprise the distance between the mobile device and the eyes of the user, and/or a digital image of the face of the user. Such an image may be captured by a front camera of the mobile device. These additional features—alone or in combination—may further enhance the security of the data.

According to an optional embodiment of the method, determining securing global positioning data values, the securing password, and the securing direction are used as variables in an encryption function for the data. Each of these parameters may be expressed in terms of data values which may then be used as input variables for an encryption function. A reassessment to the data may only be possible by accessing them via a decryption function with the same input variables.

According to one advantageous embodiment of the method, the mobile device may be a smartphone comprising a digital compass or magnetometer and an image capturing device, like a camera. The camera may be used for measuring the distance between the smartphone and the eyes of the user securing the data or reassessing the data. The electronic compass may be used for determining the direction to the Magnetic North Pole in relationship to the direction the user may hold the smartphone.

According to an embodiment of the method, the mobile device may also comprise an orientation sensor. This may allow to determine the orientation of the mobile device in a 3-dimensional space, e.g., on a sphere with a radius of the arm's-length of the user and the joint of the arm's-length to the body of the user. Data of such an orientation sensor or sensors may also be used as additional input values for a combined password for securing the data. Thus, holding the mobile device horizontally in front of a user's face may generate a different password if compared to holding the mobile device at hip level facing the user's face with the front camera. This may again enhance the data security.

One advantageous embodiment of the method may also comprise reassessing the data by determining access global positioning data values of the mobile device, and positioning the mobile device in an access direction relative to the northern direction. This embodiment may also comprise capturing an access password by the mobile device, which may—in particular—be typed in, and determining that the securing combined password matches the accessing combined password, namely the securing global positioning data values match the access global positioning data values within a global positioning data value tolerance, the securing password matches the accessing password, and the securing direction matches the access direction within a direction tolerance. On a positive outcome of the determination, access to the data may be granted.

Thus, the user may position himself again in the same place and into the same direction at the point of accessing the data. Because physical positions and body orientation are linked to a movement of the body, i.e., the physical movement memory, users may easily remember combined passwords.

One additional embodiment of the method may comprise determining that a securing distance is equal to an access distance at access time, wherein the securing distance and the access distance equals a distance between the mobile device and the eyes of the user. Also here, the distance between the eyes of the user and the mobile device may be determined using a front camera of the mobile device. A predefined tolerance between the access distance and the securing distance may be allowable.

According to a further optional embodiment of the method, the method may also comprise determining that a digital image of the face of the user at access time to the data matches a digital image of the face of the user at securing time. Again, the front camera of the mobile device may be used at secure time and at access time. The digital image of the face itself or derived metadata of the digital image may be used as additional features for the combined password. Also this way, data security may be enhanced.

According to one advantageous embodiment of the method, reassessing the data may be possible, even if the user may physically be not at the GPS coordinates if compared to the GPS coordinates at secure time. This may be possible by positioning an avatar to a location on a map representing the real world and retrieve access global positioning data values of the avatar out of related map data. The avatar and the map may be displayed simultaneously. Furthermore, a front side of the avatar may be positioned into an access direction relative to the northern direction in the map. Additionally, an access password may be captured, i.e., input by the user. Then, it may be determined that the securing global positioning data values match the access global positioning data values within a global positioning data value tolerance, the securing password matches the accessing password, and the securing direction matches the access direction within a direction tolerance. On a positive outcome of the determination, access to the data may be granted.

This may have the advantage that data access is possible even if the person, having secured the data by being located at certain GPS coordinates and a securing direction relative to the Magnetic North Pole, may not be at the same GPS coordinates when accessing the data. Thus, the person which should be positioned at the securing GPS coordinates may be mimicked by the avatar. This may not represent an easier way for security breaches. This is because the map, the avatar, the GPS coordinates and the determination of the access direction has to be part of or be integrated into the data securing system. On the other side, it gives users the ability to access that data even if they are not capable of positioning themselves at the required GPS coordinates for data access.

As will be appreciated by one skilled in the art, aspects of the present principles may be embodied as a system, method or computer program product. Accordingly, aspects of the present principles may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present principles may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present principles may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present principles are described below with reference to flowchart illustrations and/or block diagrams of methods, apparatus (systems) and computer program products according to embodiments of the principles. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the following, a detailed description of the figures will be given. All instructions in the figures are schematic. Firstly, a block diagram of an embodiment of the inventive method for securing data using a mobile device is given. Afterwards, further embodiments as well as embodiments of the system for securing data using a mobile device will be described.

Figure 1:
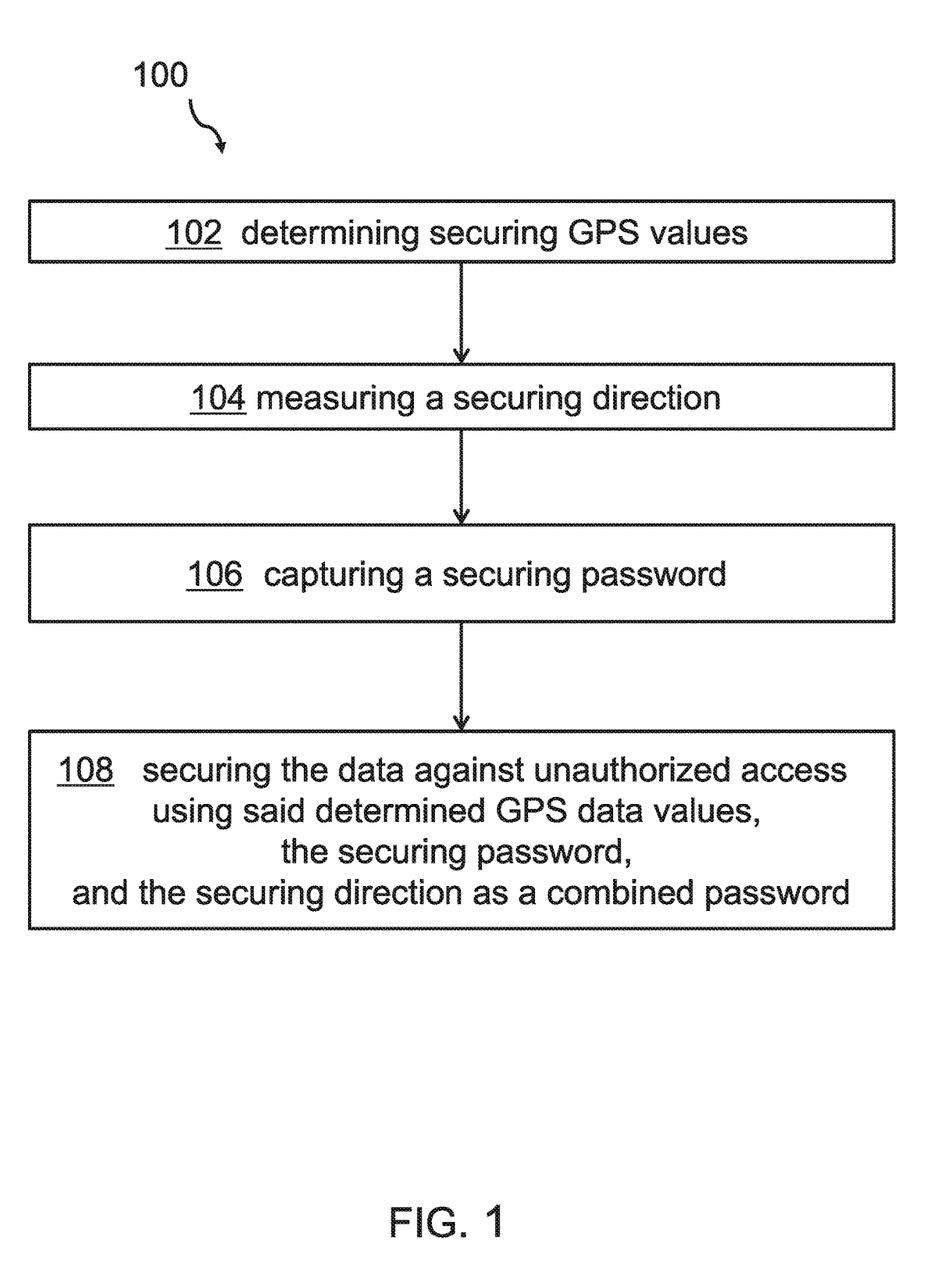
FIG. 1 shows a block diagram of an embodiment of the inventive method for securing data using a mobile device, in accordance with an embodiment of the present principles.

FIG. 1 shows a block diagram of an embodiment of the method 100 for securing data using a mobile device, in particular a smartphone, against unauthorized data access. The method comprises determining, 102, securing global positioning data values of the mobile device. These may be the GPS coordinates of the smartphone when securing the data. Furthermore, the method comprises measuring, 104, a securing direction of the mobile device relative to the Magnetic North Pole. An electronic compass is required for this as part of the smartphone or mobile device. Additionally, the method comprises capturing, 106, a securing password, which may be typed in by a user in alphanumeric form. A touch screen of the smartphone may be used for this. However, a more complex password like data structures like a fingerprint, a retina scan, face recognition or other unique data patterns or derived metadata may be used.

Then, the data are secured, 108, against unauthorized access. The determined global positioning data values, the securing password, and the securing direction are used for this securing as a combined password. Hence, the combined password may be stored together with the data. In another embodiment the combined password may be stored in a different storage than the data or elements of the combined password may be stored at different storage location and only combined to the combined password if needed. Reaccessing the data is only possible by using the same combined password as access or reaccess credentials.

It may be noted that it is not required that the data are stored within the mobile device. The data may be stored virtually anywhere. On a server, in a distributed file system, on a cloud storage system, a personal server, or any other storage system capable of establishing an electronic link, i.e., being in communication contact with the mobile device. The electronic link may be established in form of a wireless link, like a mobile phone network, or any other communication mechanism.

Figure 2:
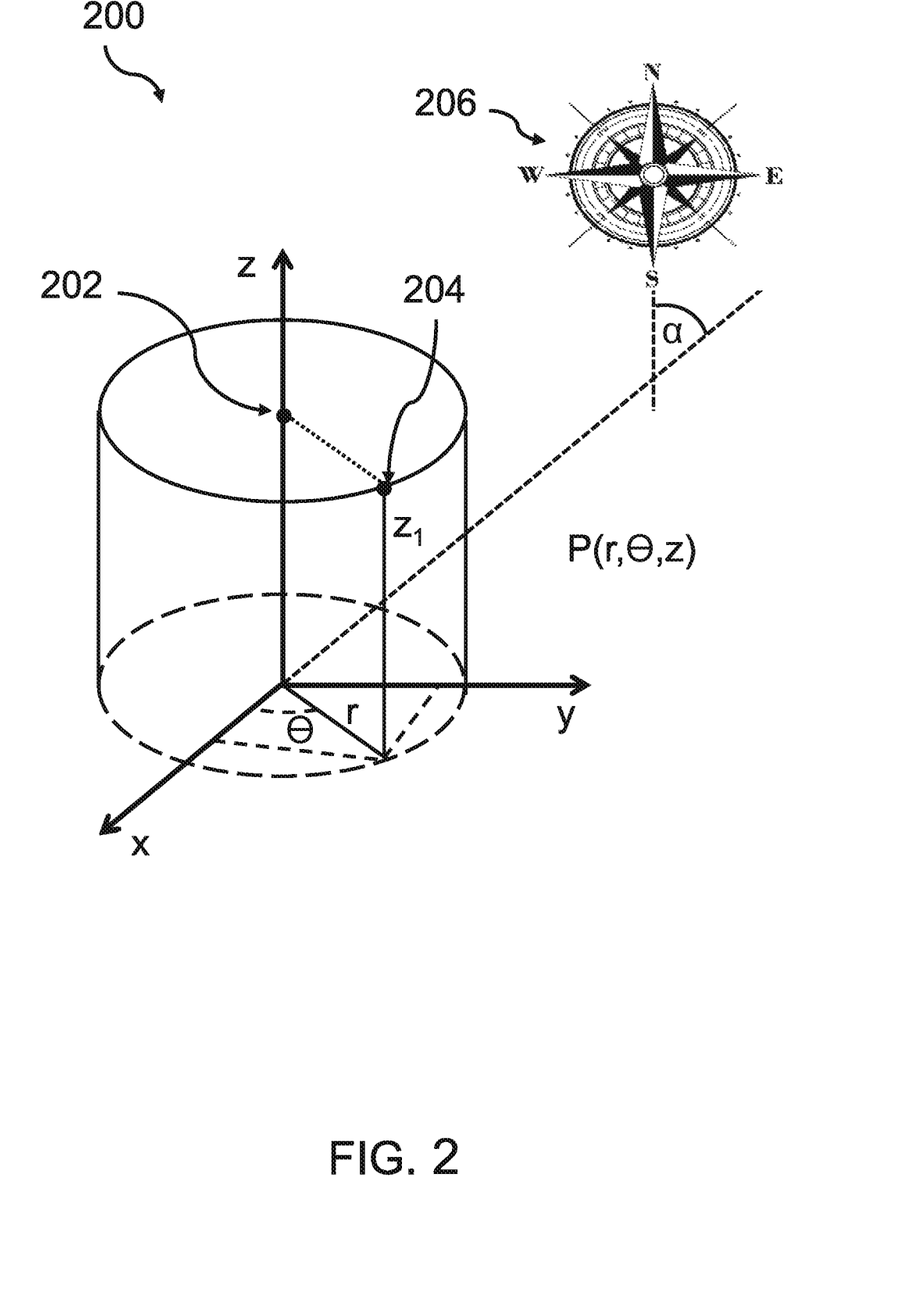
FIG. 2 shows the point representing a face of a user relative to a mobile device in cylinder coordinates, in accordance with an embodiment of the present principles.

FIG. 2 helps to illustrate the inventive concept in a more comprehensive form. It shows the point of a face of a user relative to a mobile device. One aspect of the inventive concept is the ability of the user to "hide data" in a place around him which may be easily remembered. The term 'around him' may denote a physical direction with a reference point of a current position of a user—given as GPS coordinates—relative to the Magnetic North Pole. As frame of reference for the user, a given known environment may be selected. This could be, e.g., a room, like an office room, a living room, etc. It may be indoors or may be outdoors. However, it should be ensured that a mobile device may be able of receiving signals from GPS satellites. Eventually, GPS signal repeaters may be required inside the building. It may be possible that the resolution inside buildings may be lower than outside of buildings, were a direct line of sight may be available between the mobile device and a plurality of GPS satellites. Thus, it may be the case, that there is only one GPS position available for a given room in a building even if of the potential resolution of the use of the GPS system may allow a much higher resolution.

In an embodiment, GPS coordinates of a room may be stored if no signals may be receivable from the GPS satellites. The mobile device may—in this case—receive the room related GPS coordinates via a Bluetooth communication or a WLAN link from a transponder in the room.

The user may turn into a certain direction relative to his environment, e.g., a room. He may, e.g., orient himself into a certain securing direction, which may, e.g., be the direction of the window. The user may look into that selected securing direction and position or hold his mobile device in front of his face, e.g., at an arm's-length distance. The direction of the mobile device measurement as the line from the face of the user towards the mobile device in comparison to the direction of the Magnetic North Pole may be used as the securing direction. It may be assumed that the angle between the line face-smartphone relative to the flat front cover of the smartphone is 90°. If this cannot be guaranteed—as in typical real-life environments—a deviation to the 90° assumption may be compensated by capturing accelerometer data within the smartphone.

Assuming this constellation, the securing direction may easily be calculated using cylinder coordinates 200. Each point P can be described by a radius r, and angle θ and a vertical coordinate z. However, for the purpose of the inventive concept the vertical coordinate is irrelevant. The user (not shown) may position his smartphone at point 202. The face of the user may have the coordinates 204. Thus, the smartphone (not shown) has a defined position relative to the Magnetic North Pole. The angle α may easily be calculated by using the angles θ and the orientation of the smartphone, which is placed in a 90° position relative to the line defined by the points 202—position of the smartphone—and 204 position of the face of the user. The northern direction may be symbolized by the compass rose 206. In order to have a direction of reference, it may be assumed that the x-axis of the coordinate system is the Magnetic North Pole direction.

In practical terms, the smartphone or a module inside the smartphone may measure first the GPS coordinates, and then the user may type in an alphanumeric password, and then hold the smartphone an arm's-length away into the securing direction. He may click on an OK button in order to confirm that so generated combined password out of the GPS coordinates, the password and the securing direction.

If the user wants to reassess his data, he simply returns physically to the remembered GPS coordinates—the physical location where he performed the securing process—turns into the same remembered direction, types in his password and holds the smartphone at eye's height in front of his face in the securing distance. Out of these data, the combined password will be regenerated and used for reaccessing the data.

Instead of physically positioning himself at the GPS coordinates required for reaccessing the data, the user may instead use a map—e.g., in a virtual reality environment—and position in avatar into the securing direction. He may position the avatar at the securing position on the map and the related GPS coordinates may be retrieved from a data storage related to the map. The user may then position the avatar in the virtual reality environment—a room—facing the securing direction. From these data the combined password may also be regenerated. Thus, the user may not be required to physically go to the place where he protected the data.

Figure 3:
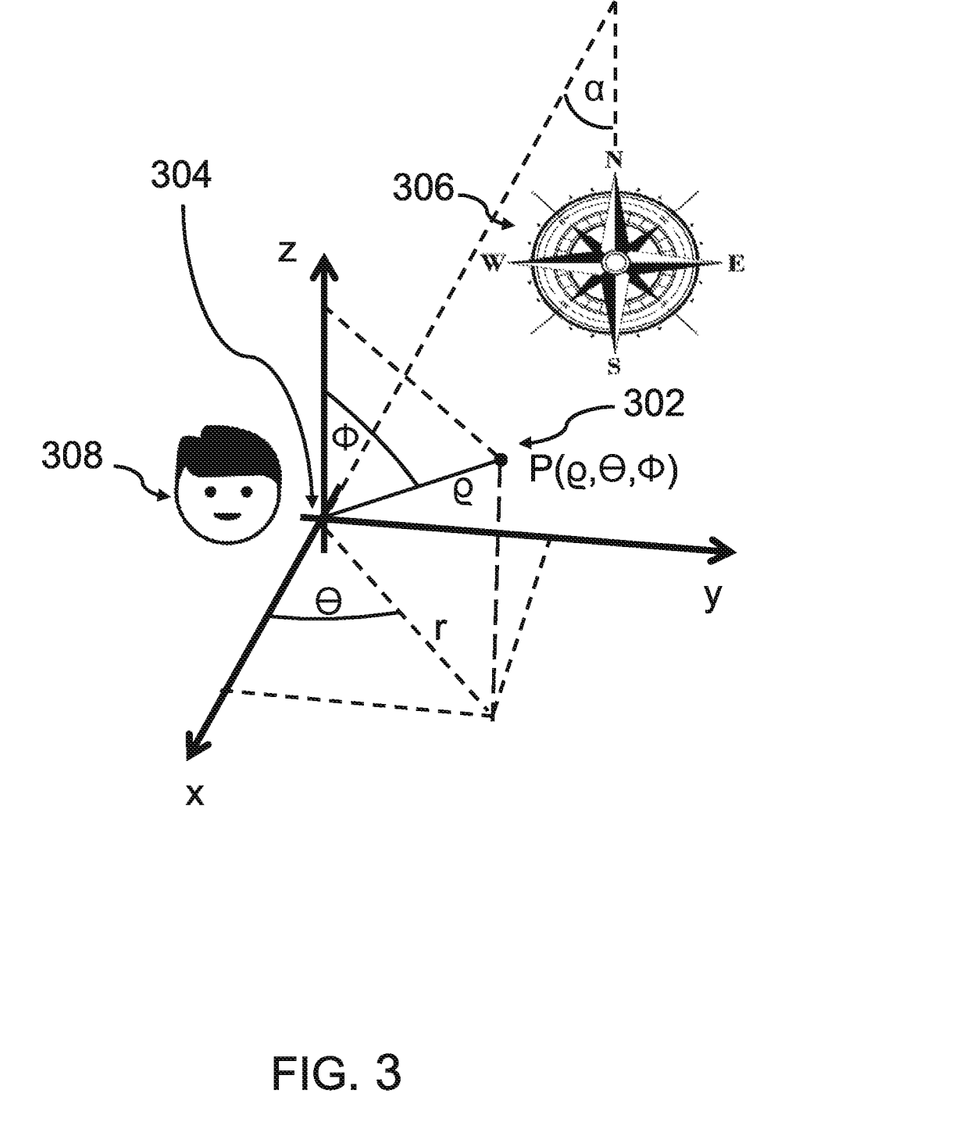
FIG. 3 shows the point representing a face of a user relative to a mobile device in spherical coordinates, in accordance with an embodiment of the present principles.

In FIG. 3 the point of the face of a user 308 is shown relative to a mobile device in spherical coordinates. As it were known by a skilled person, each point P in a three-dimensional environment may be described by the values of ς, θ, Φ. In this example, as origin 304 of the coordinate system, the face of the user 308 has been selected. The smartphone is positioned at point 302. Thus, the user may hold the smartphone (not shown) upwards—e.g., upwards above his head—relative to his face. The angle may be roughly 45°. Here again, as explained above in the context of FIG. 2, the securing direction a may easily be calculated using the angle Φ. However, if the user may hold his smartphone at an arm's-length distance of his face or his eyes, also the angle Φ may be used for enhancing the number of securing parameters or features for the combined password. Now, not only the securing direction of the line face-smartphone versus the Magnetic North Direction may be used as additional securing feature for data protection but also the angle of the direction the smartphone is hold up and down relative to the face of the user 308. This angle may also be used as an additional feature of the combined password increasing data security even more. Again, the northern direction may be symbolized by the compass rose 306.

It may be noted that in case of FIG. 2—cylinder coordinates—as well as in case of FIG. 3 in different distance between the face of the user 308 and the position of the smartphone relative to the face may result in a different combined password. A skilled person may understand that predefined tolerance values for all measured variables may be used as individual threshold values to determining a matching of securing parameters (e.g., GPS coordinates, orientation towards the Magnetic North Pole, elevation angle relative to the face), i.e., securing parameters versus accessing parameters—may be applied.

Additionally, the angle Φ may also be captured in a virtual reality environment using the avatar. In this case, a virtual arm's-length may be positioned into the right angle relative to a reference point of the avatar, e.g., his face.

Figure 4:
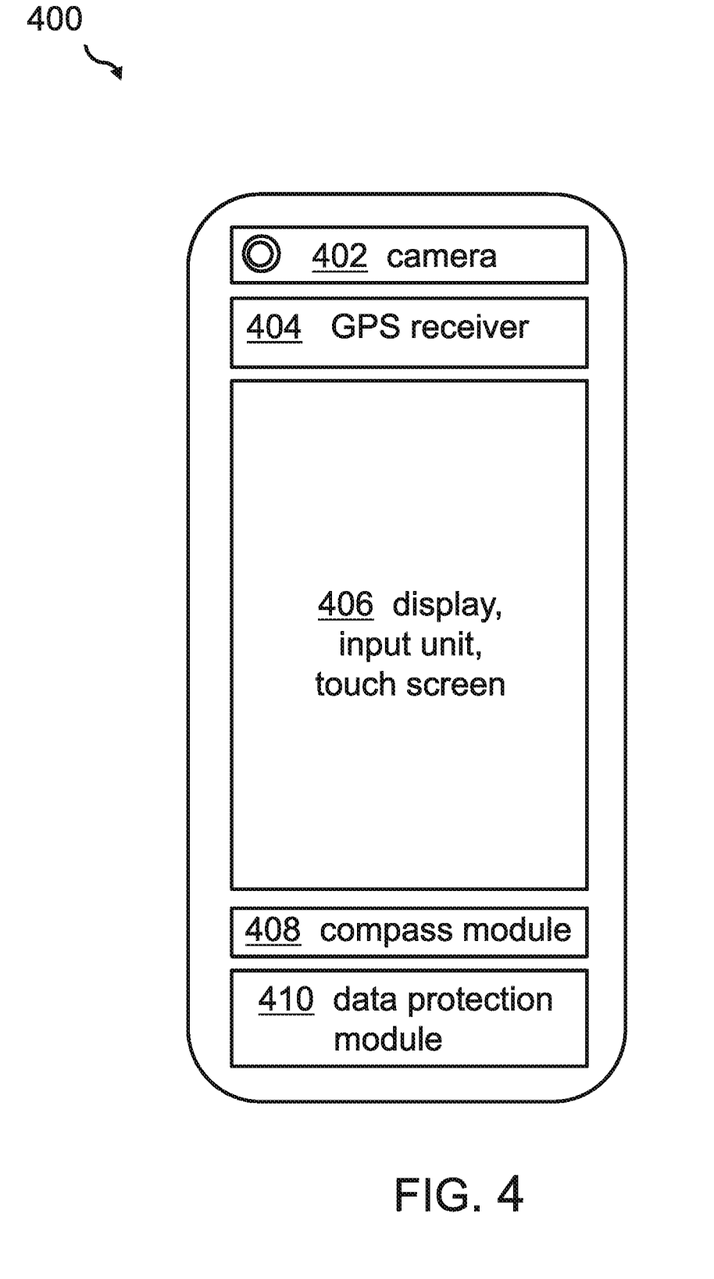
FIG. 4 shows a block diagram of an embodiment of the system for securing data using a mobile device, in accordance with an embodiment of the present principles.

FIG. 4 shows a block diagram of an embodiment of the system 400 for securing data using a mobile device. The system, which may be integrated at least partially into a smartphone, comprises a global positioning data receiver 404 adapted for receiving global positioning data values of said mobile device as securing global positioning data values, and an input unit 406 adapted for capturing a securing password. This may be combined with a display in form of a touch screen 406. The system comprises further a compass module 408 adapted for measuring a securing direction of said mobile device relative to a magnetic north direction, and a data protection module 410 adapted for securing said data against unauthorized access using said determined global positioning data values, said securing password, and said securing direction as a combined password. Furthermore, the system may also comprise a camera—in particular a front camera 402. This may be used for measuring the distance between the smartphone and the eyes of the user facing the smartphone.

Figure 5:
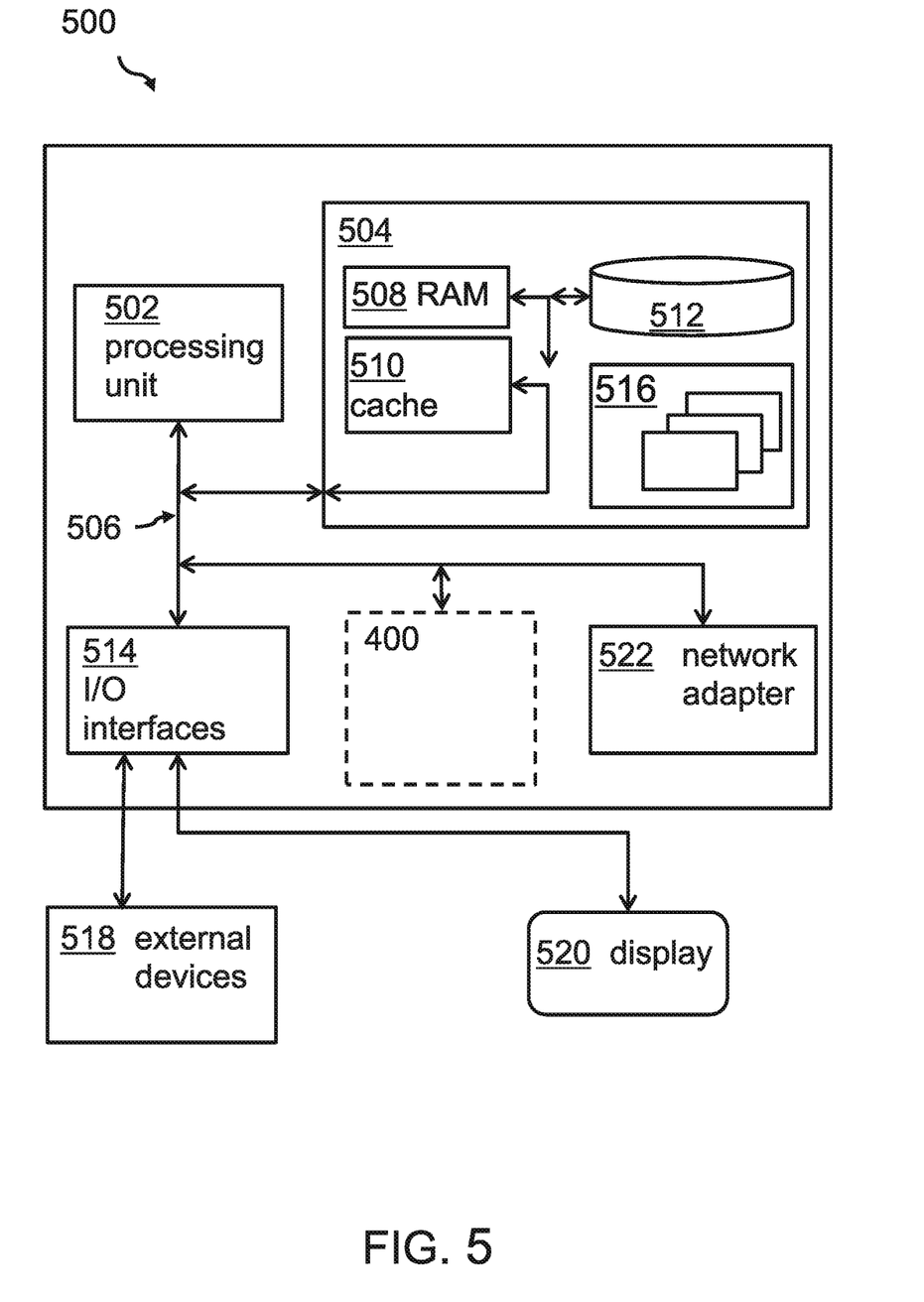
FIG. 5 shows an embodiment of a computing system comprising the system for securing data, in accordance with an embodiment of the present principles.

Embodiments of the invention may be implemented together with virtually any type of computer, regardless of the platform being suitable for storing and/or executing program code. FIG. 5 shows, as an example, a computing system 500—like a mobile device or a smartphone—suitable for executing program code related to the proposed method.

The computing system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500.

Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couples various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

Program/utility 514, having a set (at least one) of program modules 516, may be stored in memory 504 by way of example, and not limitation, as well as an operating system, one or more application programs, other program modules, and program data. Each of the operating system, one or more application programs, other program modules, and program data or some combination thereof, may include an implementation of a networking environment. Program modules 516 generally carry out the functions and/or methodologies of embodiments of the invention as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. The keyboard, pointing device and the display may be integrated into a touch screen. The network adapter may be linked to a communication module for wireless communication, e.g., in a public or private mobile network. —The communication can occur via Input/output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that although not shown, other hardware and/or software components could be used in conjunction with computer system/server 500. Examples, include, but are not limited to: microcode, device drivers, redundant processing units, and external disk drive arrays, RAID systems, tape drives, and data archival storage systems, etc.

Additionally, the system 400 for securing data may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for securing data using a mobile device, comprising:

determining securing global positioning data values of the mobile device;

measuring a securing direction of said mobile device relative to a magnetic north direction;

capturing a securing password by said mobile device; and securing said data against unauthorized access using said determined global positioning data values, said securing password, and said securing direction as a combined password.

2. The method according to claim 1, wherein said measuring a securing direction of said mobile device further comprises:

positioning the mobile device at arm's-length in front of a face of a user; and measuring a distance from the mobile device to eyes of said user.

3. The method according to claim 2, wherein said positioning said mobile device into a securing direction further comprises: measuring a distance between the mobile device and said eyes of said user as a securing distance.

4. The method according to claim 3, wherein said combined password is selected from the group consisting of said distance between the mobile device and said eyes of said user, and a digital image of said face of said user.

5. The method according to claim 1, wherein said determined securing global positioning data values, said securing password, and said securing direction are used as variables in an encryption function for said data.

6. The method according to claim 1, wherein said mobile device is a smartphone comprising a digital compass and an image capturing device.

7. The method according to claim 1, wherein said mobile device also comprises an orientation sensor.

8. The method according to claim 1, further comprising: including data from an orientation sensor from said mobile device into said combined password.

9. The method according to claim 8, further comprising: determining that a securing distance is equal to an access distance at access time, wherein said securing distance and said access distance equals a distance between said mobile device and said face of said user.

10. The method according to claim 8, further comprising: determining that a digital image of said face of said user at access time to said data matches a digital image of said face of said user at securing time.

11. The method according to claim 1, further comprising reassessing said data by:

determining access global positioning data values of said mobile device;

positioning said mobile device in an access direction relative to said magnetic northern direction;

capturing an access password by the mobile device;

determining that:

said securing global positioning data values match said access global positioning data values within a global positioning data value tolerance;

said securing password matches said accessing password; and said securing directions matches said access direction within a direction tolerance; and granting access to said data on a positive outcome of said determination.

12. The method according to claim 1, further comprising reassessing said data by:

positioning an avatar to a location on a map representing the real world and retrieve access global positioning data values of said avatar out of related map data, wherein said avatar and said map are displayed;

positioning a front side of said avatar into an access direction relative to said northern direction in said map;

capturing an access password;

determining that:

said securing global positioning data values match said access global positioning data values within a global positioning data value tolerance;

said securing password matches said accessing password; and said securing direction matches said access direction within a direction tolerance; and granting access to said data on a positive outcome of said determination.

13. A system for securing data using a mobile device, comprising:

a global positioning data receiver to receive global positioning data values of said mobile device as securing global positioning data values;

a compass measurer to measure a securing direction of said mobile device relative to a magnetic north direction;

an input device to capture a securing password; and a data protector to secure said data against unauthorized access using said determined global positioning data values, said securing password, and said securing direction as a combined password.

14. The system according to claim 13, further comprising:

a distance measurer to measure a distance between the mobile device and said eyes of said user as securing distance.

15. The system according to claim 14, wherein said distance measurer further comprises an image capturing device.

16. The system according to claim 13, wherein said mobile device further comprises an orientation sensor.

17. The system according to claim 13, further comprising:

a reassessor to reassess said data, wherein said reassessor grants access to said data on a positive outcome of said determination; and a determiner to determine whether:

said securing global positioning data values match said access global positioning data values within a global positioning data value tolerance;

said securing password matches said accessing password; and said securing direction matches said access direction within a direction tolerance, wherein said global positioning data receiver further receives global positioning data values of said mobile device as access global positioning data values, wherein said compass measurer further measures an access securing direction of said mobile device relative to a magnetic north direction, and wherein said input device further captures an access password.

18. The system according to claim 13, further comprising: an encryptor to encrypt said data by using said determined securing global positioning data values, said securing password, and said securing direction as input variables for said encryption module.

19. A computer program product for securing data using a mobile device, said computer program product comprising a computer readable storage medium having program instructions embodied therewith, said program instructions being executable by a computing system to cause said computing system to:
- determine securing global positioning data values of the mobile device;
- capture a securing password by said mobile device;
- measure a securing direction of said mobile device relative to a magnetic north direction; and
- secure said data against unauthorized access using said determined global positioning data values, said securing password, and said securing direction as a combined password.

* * * * *